United States Patent
Lim

(10) Patent No.: US 12,041,246 B2
(45) Date of Patent: Jul. 16, 2024

(54) ACCESS OF ESSENTIAL VIDEO CODING (EVC) SLICES IN A FILE

(71) Applicant: Samsung Electronics Co., Ltd., Suwon-si (KR)

(72) Inventor: Youngkwon Lim, Allen, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 108 days.

(21) Appl. No.: 17/476,255

(22) Filed: Sep. 15, 2021

(65) Prior Publication Data

US 2022/0109856 A1    Apr. 7, 2022

Related U.S. Application Data

(60) Provisional application No. 63/133,996, filed on Jan. 5, 2021, provisional application No. 63/088,057, filed on Oct. 6, 2020.

(51) Int. Cl.
*H04N 19/174* (2014.01)
*H04N 19/169* (2014.01)

(52) U.S. Cl.
CPC ......... *H04N 19/174* (2014.11); *H04N 19/169* (2014.11)

(58) Field of Classification Search
CPC .............................. H04N 19/174; H04N 19/169
See application file for complete search history.

(56) References Cited

U.S. PATENT DOCUMENTS

| | | |
|---|---|---|
| 2011/0064146 A1 | 3/2011 | Chen et al. |
| 2013/0114694 A1 | 5/2013 | Chen et al. |
| 2013/0195173 A1 | 8/2013 | Wang et al. |
| 2013/0343465 A1 | 12/2013 | Chen et al. |
| 2017/0346873 A1* | 11/2017 | Denoual .............. H04N 21/845 |
| 2017/0347109 A1* | 11/2017 | Hendry .................. H04N 19/96 |
| 2019/0174161 A1* | 6/2019 | Skupin ............... H04N 21/4728 |
| 2019/0273935 A1 | 9/2019 | Li et al. |
| 2021/0258598 A1* | 8/2021 | Hendry ................ H04N 19/174 |
| 2022/0369005 A1* | 11/2022 | Hirabayashi ......... H04N 21/816 |
| 2023/0015840 A1* | 1/2023 | Sánchez De La Fuente ............... H04N 21/8451 |

OTHER PUBLICATIONS

Choi et al. (Eds.), "Text of ISO/IEC CD 23094-1, Essential Video Coding", ISO/IEC JTC1/SC29/WG11 N18568, Jul. 2019, 292 pages.

(Continued)

*Primary Examiner* — Zhubing Ren

(57) ABSTRACT

An includes a decoding device for fast and efficient access of the EVC slices in a file, The decoding device includes a communication interface and a processor operably coupled to the communication interface. The communication interface is configured to receive a compressed bitstream. The processor determines one or more slices of the compressed bitstream to decode, in a component track. The processor also identifies a track reference in a configuration record of the component track, wherein the track reference indicates a track that is separate from the component track and the track includes parameter sets required to process the one or more slices. The processor further decodes for display the one or more slices using the parameter sets included in the indicated track.

20 Claims, 7 Drawing Sheets

(56) References Cited

OTHER PUBLICATIONS

Lim, "EVC Slice Track", ISO/IEC JTC 1/SC 29/WG 3 m55182, Oct. 2020, 5 pages.
Lim, "Updates on EVC Slice Track", ISO/IEC JTC 1/SC 29/WG 03 m56029, Jan. 2021, 6 pages.
"Information technology—Coding of audio-visual objects—Part 15: Carriage of network abstraction layer (NAL) unit structured video in the ISO base media file format—Amendment 2: Carriage of VVC and EVC in ISOBMFF", ISO/IEC 14496-15:2019(E) Amendment 2, ISO/IEC JTC 1/SC 29/WG 11, Dec. 2020, 57 pages.
"Information technology—Coding of audio-visual objects—Part 15: Carriage of network abstraction later (NAL) unit structured video in the ISO base media file format", ISO/IEC 14496-15:2021(E), ISO/IEC JTC 1/SC 29/WG 03, Dec. 2020, 282 pages.
International Search Report and Written Opinion issued Jan. 5, 2022 regarding International Application No. PCT/KR2021/013501, 8 pages.

\* cited by examiner

ACCESS OF ESSENTIAL VIDEO CODING (EVC) SLICES IN A FILE

CROSS-REFERENCE TO RELATED APPLICATION AND PRIORITY CLAIM

This application claims priority under 35 U.S.C. § 119(e) to U.S. Provisional Patent Application No. 63/088,057 filed on Oct. 6, 2020, and U.S. Provisional Patent Application No. 63/133,996 filed on Jan. 5, 2021, which are hereby incorporated by reference in its entirety.

TECHNICAL FIELD

This disclosure relates generally to essential video coding (EVC) devices and processes. More specifically, this disclosure relates to fast and efficient access of the essential EVC slices in a file.

BACKGROUND

ISO/IEC 23094-1 EVC supports coding of rectangular regions within a picture as independently decodable units, so called slices. EVC slice syntax has been specified in a way that can parse individual slices without referring the information from other slices. In addition, it can also be encoded to have no coding dependencies with other slices in the same picture but with other slices from the previous coded pictures so that they can be independently decoded. If one or more slices are stored in the separate tracks, then the application can access only access required slices fast and efficiently by parsing the relevant tracks only instead of parsing an entire stream stored in a single track to identify slices of interest.

SUMMARY

This disclosure provides fast and efficient access of the EVC slices in a file.

In a first embodiment, an apparatus includes a decoding device for fast and efficient access of the EVC slices in a file, The decoding device includes a communication interface and a processor operably coupled to the communication interface. The communication interface is configured to receive a compressed bitstream. The processor is configured to determine one or more slices of the compressed bitstream to decode, in a component track. The processor is also configured to identify a track reference in a configuration record of the component track, wherein the track reference indicates a track that is separate from the component track and the track includes parameter sets required to process the one or more slices. The processor is further configured to decode for display the one or more slices using the parameter sets included in the indicated track.

In a second embodiment, a method for fast and efficient access of the EVC slices in a file g includes receiving a compressed bitstream and metadata related to the compressed bitstream. The method also includes determining one or more slices of the compressed bitstream to decode, in a component track. The method further includes identifying a track reference in a configuration record of the component track, wherein the track reference indicates a track that is separate from the component track and the track includes parameter sets required to process the one or more slices. In addition, the method includes decoding for display the one or more slices using the parameter sets included in the indicated track.

In a third embodiment, an apparatus includes an encoder for fast and efficient access of the EVC slices in a file. The encoder including a processor and a communication interface operably coupled to the processor. The processor is configured to encode parameter sets in a track for processing one or more slices in a component track. The processor is further configured to encode one or more slices in a component track that is separate from the track with the parameter sets. The processor is also configured to encode a track reference in a configuration record of the component track, wherein the track reference indicates the track including the parameter sets required to process the one or more slices. The communication interface is configured to transmit a compressed bitstream including the track and the component tracks.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

As discussed above, ISO/IEC 23094-1 EVC supports coding of rectangular regions within a picture as independently decodable units, which can be referred to as slices. EVC slice syntax has been specified in a way that it can be parsed individually without referring the information from other slices. In addition, the EVC slice syntax can also be encoded to have no coding dependencies with other slices in the same picture but with other slices from the previous coded pictures so that they can be independently decoded. If one or more slices are stored in the separate tracks, then the applications can access required slices fast and efficiently by only parsing the relevant tracks instead of parsing an entire stream stored in a single track to identify slices of interest.

This application provides a method for containing one or more slice data individually accessible in a track for fast and efficient access of the one or more slices for certain use cases instead of entire picture. Video coding layer (VCL) network abstraction layer (NAL) units of one or more slices composed of slices are stored in a single track so that the application can find a particular slice in a single track consistently. To provide the information for identifying the slices stored in each track, a list of slice identifications (IDs) of the slices are stored in a sample entry of the track containing the slices so that the application can understand the track contains data of interest. To avoid cases where parameter sets are stored in multiple tracks, all the non-VCL NAL units are stored in a single track and all the parameter sets or copies of the parameter are stored in a sample entry of the single track. When the parameter sets are stored in a stream interleaved with the VCL NAL units, the parameter sets are stored in the sample entry of the track. Track references to the track contain all parameter sets required for the track so that the application can find the relevant parameter sets.

Figure 1:
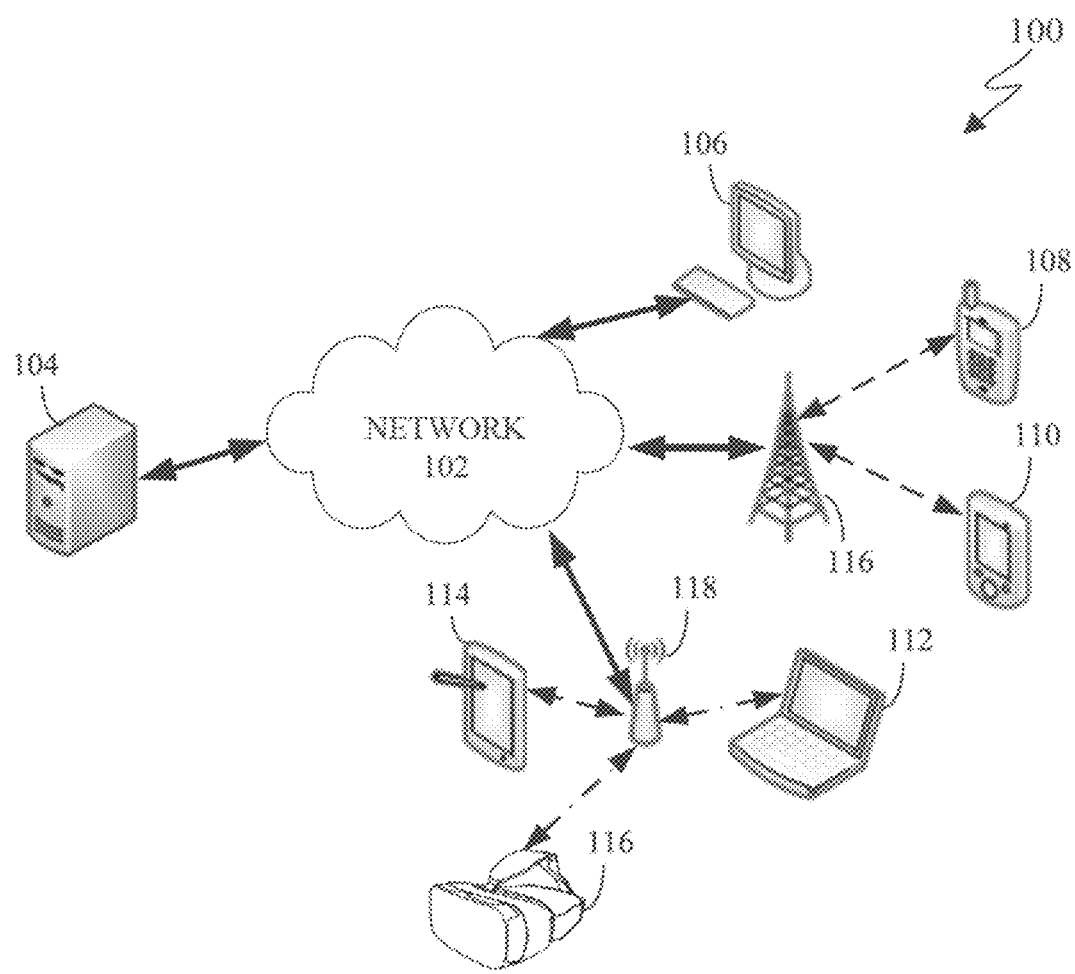
FIG. 1 illustrates an example communication system in accordance with an embodiment of this disclosure.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and an HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display a 360° scene including one or more 3D point clouds. In certain embodiments, any of the client devices 106-116 can include an encoder, decoder, or both. For example, the mobile device 108 can record a video and then encode the video enabling the video to be transmitted to one of the client devices 106-116. In another example, the laptop computer 112 can be used to generate a virtual 3D point cloud, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud, generate a bitstream that represents the point cloud, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud, compress a 3D point cloud, transmit a 3D point cloud, receive a 3D point cloud, render a 3D point cloud, or a combination thereof. For example, the server 104 encodes parameter sets in a track for processing one or more slices in a component track; encodes one or more slices in a component track that is separate from the track with the parameter sets; encodes a track reference in a configuration record of the component track; and then transmit the bitstream to one or more of the client devices 106-116. For another example, one of the client devices 106-116 can encodes parameter sets in a track for processing one or more slices in a component track; encodes one or more slices in a component track that is separate from the track with the parameter sets; encodes a track reference in a configuration record of the component track; and then transmit the bitstream to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
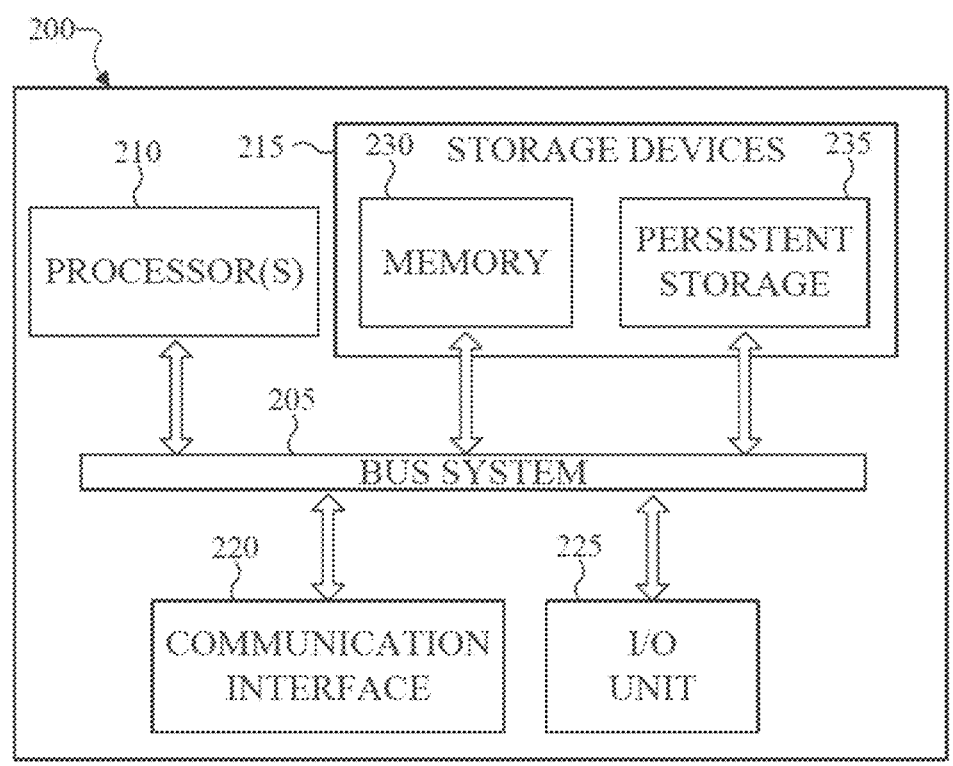
FIGS. 2 and 3 illustrate example electronic devices in accordance with an embodiment of this disclosure.
Figure 3:
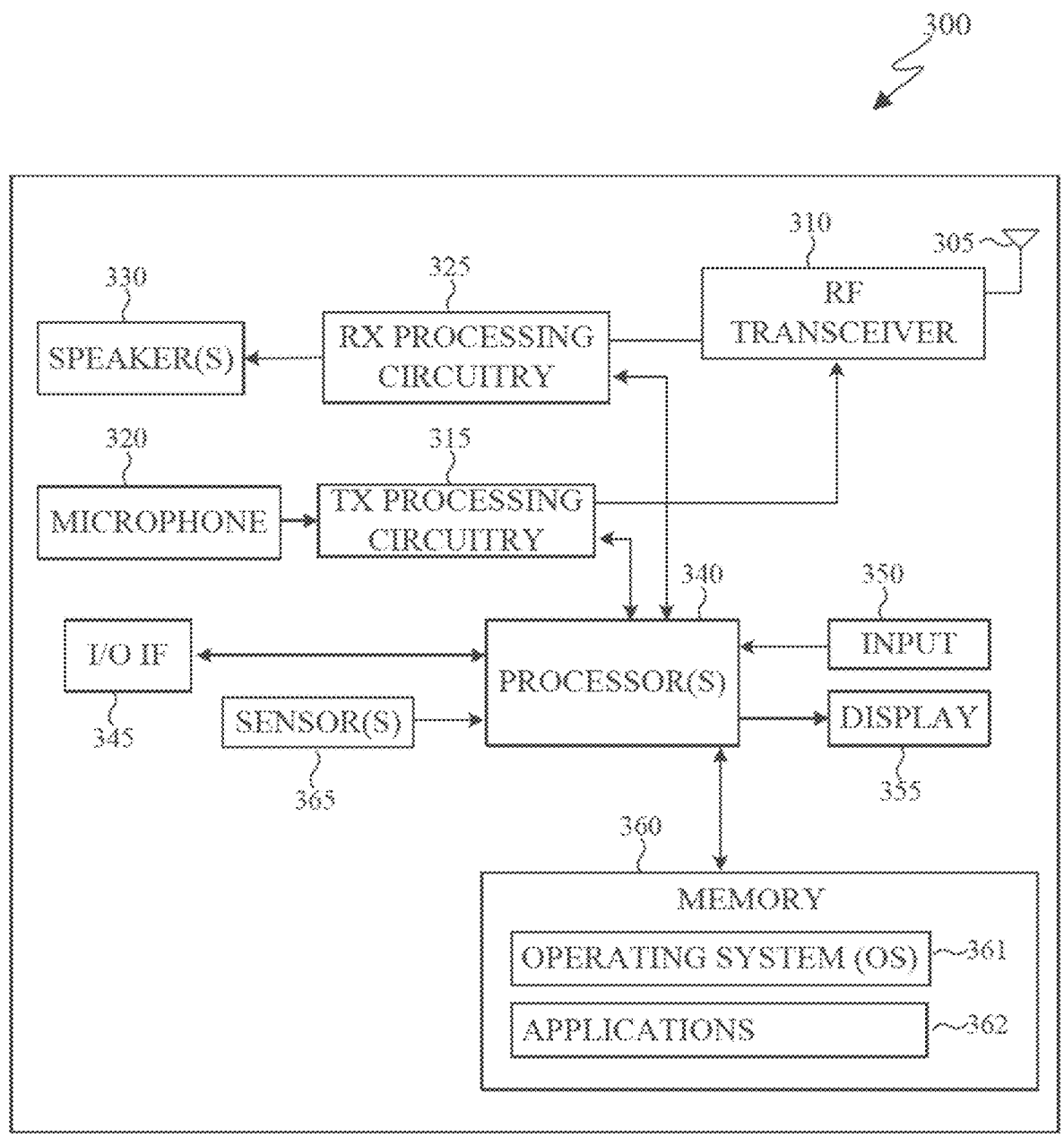

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

As shown in FIG. 2, the server 200 includes a bus system 205 that supports communication between at least one processing device (such as a processor 210), at least one storage device 215, at least one communications interface 220, and at least one input/output (I/O) unit 225. The server 200 can represent one or more local servers, one or more compression servers, or one or more encoding servers, such as an encoder. In certain embodiments, the encoder can perform decoding.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can encode a 3D point cloud stored within the storage devices 215. In certain embodiments, encoding a 3D point cloud also decodes the 3D point cloud to ensure that when the point cloud is reconstructed, the reconstructed 3D point cloud matches the 3D point cloud prior to the encoding.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). For example, the instructions stored in the memory 230 can include instructions for determining one or more slices of the compressed bitstream to decode in a component track, instructions for identifying a track reference in a configuration record of the component track, instructions decoding for display the one or more slices using the parameter sets included in the indicated track. The instructions stored in the memory 230 can also include instructions for encoding parameter sets in a track for processing one or more slices in a component track, instructions for encoding one or more slices in a component track that is separate from the track with the parameter sets, instructions for encoding a track reference in a configuration record of the component track, and instructions for transmitting the compressed bitstreams including the track and the component tracks. The instructions stored in the memory 230 can also include instructions for rendering a 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116 or receive a bitstream containing a 3D point cloud from another device such as one of the client device 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD). The display 355 can display 3D objects, such as a 3D point cloud.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

The electronic device 300 can encode parameter sets in a track for processing one or more slices in a component track. The electronic device 300 can encode one or more slices in a component track that is separate from the track with the parameter sets. The electronic device 300 can encode a track reference in a configuration record of the component track, where the track reference indicates the track including the parameter sets required to process the one or more slices. The electronic device 300 can transmit the compressed bitstream including the track and the component track. The track and the component track can be transmitted directly to another electronic device or indirectly such as through the network 102 of FIG. 1. Another electronic device, similar to the electronic device 300, can receive a bitstream directly from the electronic device 300 or indirectly such as through the network 102 of FIG. 1.

Similarly, when decoding media content included in a bitstream that represents a 3D point cloud, the electronic device 300 receives a compressed bitstream. The electronic device 300 determines one or more slices of the compressed bitstream to decode in a component track. The electronic device 300 can identify a track reference in a configuration record of the component track, where the track reference identifies a track that is separate from the component track and the track includes parameter sets required to process the one or more slices. The electronic device 300 decodes for display the one or more slices using the parameter sets included in the indicated track. In certain embodiments, after reconstructing the 3D point cloud, the electronic device 300 can render the 3D point cloud in three dimensions via the display 355.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
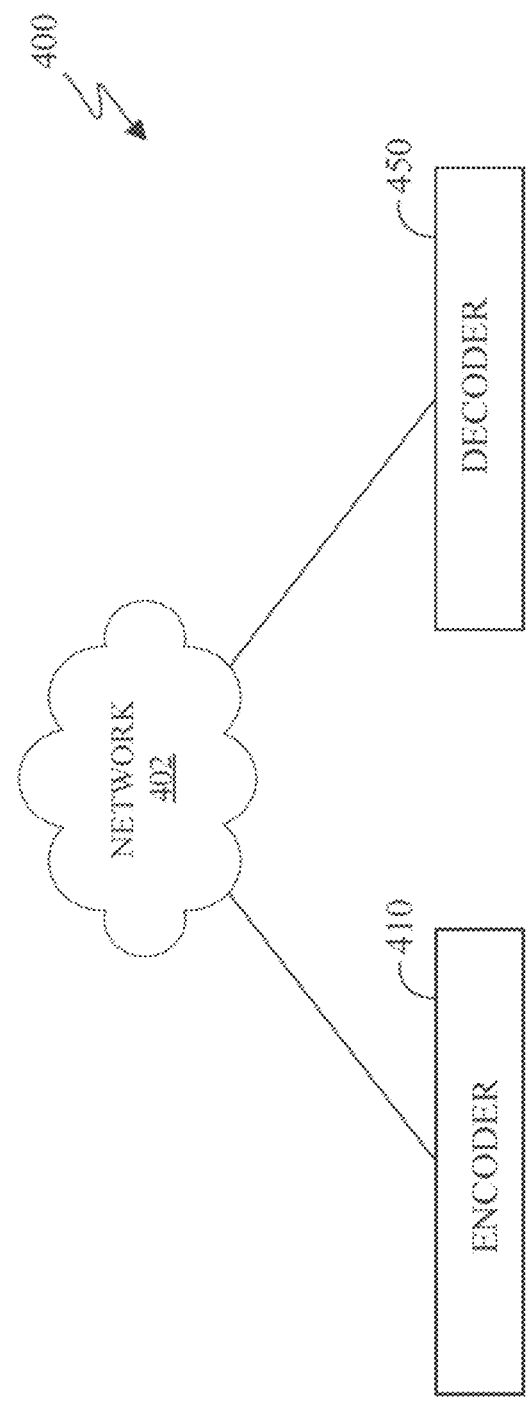
FIG. 4 illustrates a block diagram of an example environment-architecture in accordance with an embodiment of this disclosure.

FIG. 4 illustrates a block diagram of an example environment-architecture 400 for storage of EVC decoder configuration information in accordance with an embodiment of this disclosure. The embodiment of FIG. 4 is for illustration only. Other embodiments can be used without departing from the scope of this disclosure.

As shown in FIG. 4, the example environment-architecture 400 includes an encoder 410 and a decoder 450 in communication over a network 402. The network 402 can be the same as or similar to the network 102 of FIG. 1. In certain embodiments, the network 402 represents a "cloud" of computers interconnected by one or more networks, where the network is a computing system utilizing clustered computers and components that act as a single pool of seamless resources when accessed. Also, in certain embodiments, the network 402 is connected with one or more servers (such as the server 104 of FIG. 1, the server 200), one or more electronic devices (such as the client devices 106-116 of FIG. 1, the electronic device 300), the encoder 410, and the decoder 450. Further, in certain embodiments, the network 402 can be connected to an information repository (not shown) that contains media content that can be encoded by the encoder 410, decoded by the decoder 450, or rendered and displayed on an electronic device.

In certain embodiments, the encoder 410 and the decoder 450 can represent the server 104, one of the client devices 106-116 of FIG. 1, or another suitable device. The encoder 410 and the decoder 450 can include internal components similar to the server 200 of FIG. 2 and electronic device 300 of FIG. 3. In certain embodiments, the encoder 410 and the decoder 450 can be a "cloud" of computers interconnected by one or more networks, where each is a computing system utilizing clustered computers and components to act as a single pool of seamless resources when accessed through the network 402. In some embodiments, a portion of the components included in the encoder 410 or the decoder 450 can be included in different devices, such as multiple servers 104 or 200, multiple client devices 106-116, or other combination of different devices. In certain embodiments, the encoder 410 is operably connected to an electronic device or a server while the decoder 450 is operably connected to an electronic device. In certain embodiments, the encoder 410 and the decoder 450 are the same device or operably connected to the same device.

The encoder 410 receives media content from another device such as a server (similar to the server 104 of FIG. 1, the server 200 of FIG. 2) or an information repository (such as a database). The encoder 410 can encode parameter sets in a track for processing one or more slices in a component track. The encoder 410 can encode one or more slices in a component track that is separate from the track with the parameter sets. The encoder 410 can encode track reference in a configuration record of the component track, where the track reference indicates the track including the parameter sets required to process the one or more slices. The encoder 410 transmits frames representing the media content as an encoded bitstream. The bitstream can be transmitted to an information repository (such as a database) or an electronic device that includes a decoder (such as the decoder 450), or the decoder 450 itself through the network 402.

The decoder 450 can receive a bitstream that represents media content. The bitstreams can include data representing EVC decoder configuration information. In certain embodiments, the decoder 450 can determine one or more slices of the compressed bitstream to decode in a component track. The decoder 450 can identify a track reference in a configuration record of the component track, where the track reference indicates a track that is separate from the component track and the track includes parameter sets required to process the one or more slices. The decoder 450 can decode for display the one or more slices using the parameter sets included in the indicated track.

Although FIG. 4 illustrates examples of an encoder 410 and a decoder 450, various changes can be made to FIG. 4. For example, various components in FIG. 4 could be combined, further subdivided, or omitted and additional components could be added according to particular needs. As a particular example, the encoder 410 or decoder 450 could be divided into multiple components. In addition, as with computing and communication, encoders and decoders can come in a wide variety of configurations, and FIG. 4 does not limit this disclosure to any particular encoder or decoder.

Figure 5:
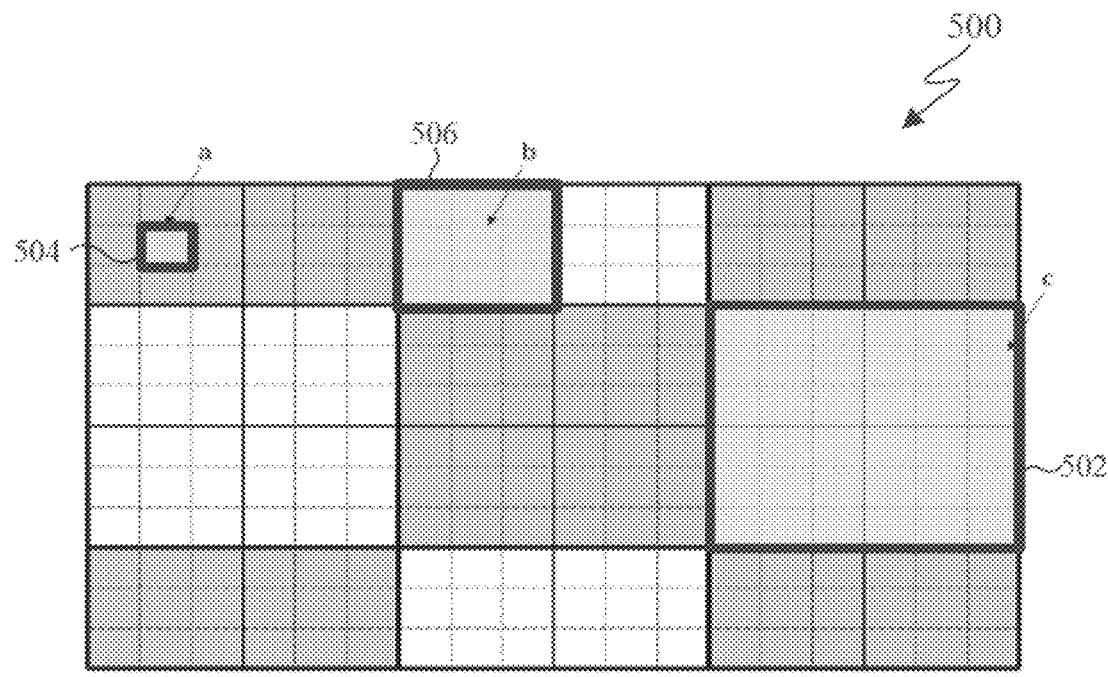
FIG. 5 illustrates an example picture divided into slices in accordance with this disclosure.

FIG. 5 illustrates a picture 500 divided into slices 502 in accordance with this disclosure. The embodiment of the picture 500 illustrated in FIG. 5 is for illustration only. FIG. 5 does not limit the scope of this disclosure to any particular implementation of an electronic picture.

As shown in FIG. 5, ISO/IEC 23094-1 EVC supports coding of rectangular regions within a picture 500 as independently decodable units, so called slices 502. The picture 500 is also divided into coding tree units (CTUs) 504 and tiles 506, which are groups of CTUs 504. A CTU 504 corresponds to a group of pixels. The CTU 504 dictates characteristics for luma and chroma coding blocks. Modern video codec uses CTU instead of microplot, due to microplot having a defined size. Tiles 506 are independently decodable regions of a picture 500 that can include one or more CTU 504. Typically, tiles 506 are equally partitioned groups of CTUs 504 in a picture 500.

EVC syntax for slices 502 has been specified in a way that each slice can be parsed individually without referring to the information from other slices 502. A slice 502 is encoded to have no coding dependencies with other slices 502 in the same picture 500 but with slices 502 from a previously coded picture 500 in a manner that they can be independently decoded. A slice 502 can include one or more tiles 506. Where tiles normally have a defined numbering system, slices are not defined. In certain embodiments, a slice 502 can be formed from a rectangular portion of tiles 506. Since slices 502 are not numbered, each file could contain a slice with an indication that a portion of the file has only slices 502. Storing one or more slices 502 separately in a file can reduce difficulty identify particular slices 502 without looking at other portions of the picture. In certain embodiments, each slice 502 could be identified by a smallest number identification of a tile 506.

Although FIG. 5 illustrates a picture 500, various changes may be made to FIG. 5. For example, the sizes, shapes, and dimensions of the picture 500 and its individual components can vary as needed or desired. Also, the number and placement of various components of the picture 500 can vary as needed or desired. In addition, the picture 500 may be used in any other suitable imaging process and is not limited to the specific processes described above.

Figure 6:
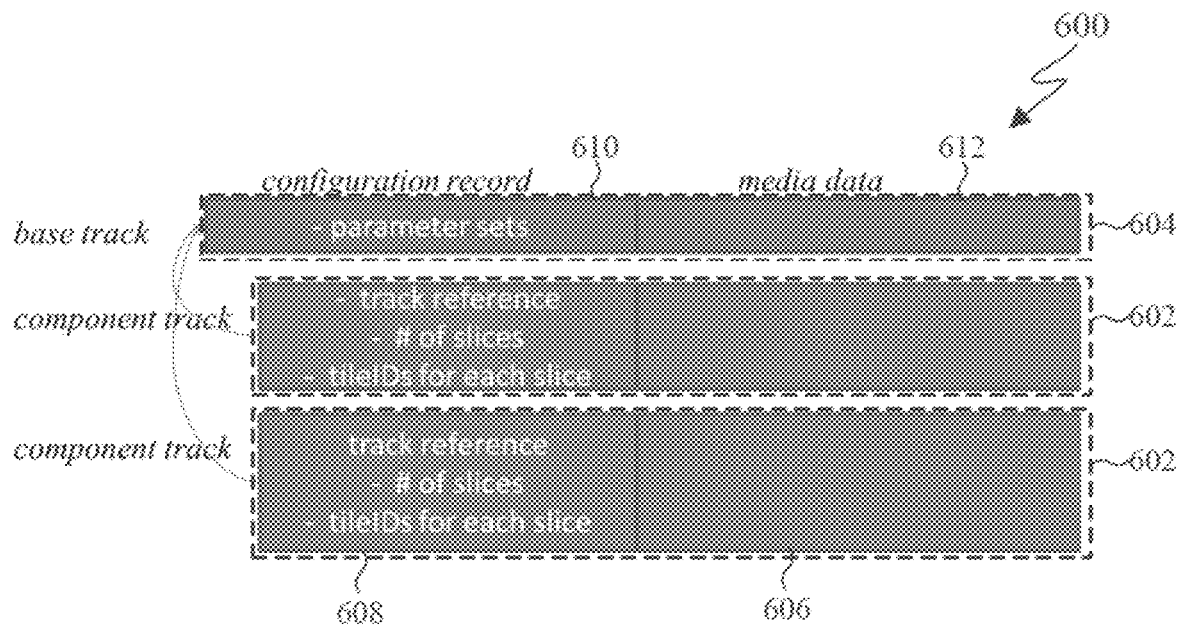
FIG. 6 illustrates an example bitstream in accordance with this disclosure.

FIG. 6 illustrates a file 600 in accordance with this disclosure. The embodiment of the file 600 illustrated in FIG. 6 is for illustration only. FIG. 6 does not limit the scope of this disclosure to any particular implementation of an electronic device.

As shown in FIG. 6, applications only requiring some slices 502 can have a file 600 split into component tracks 602 and a base track 604. A file 600 can indicate each slice 502 that is stored in media data 606 of a component track 602 with information kept in a configuration record 608. Storage of EVC in International Organization for Standardization (ISO) base media format (ISOBMFF) provides signaling information to indicate component tracks 602 containing one or more slices 502 and a base track 604 containing initialization information for the component tracks 602 containing the one or more slices 502. An EVC slice component track 602 is a track that contains a subset of a picture 500 composed of one or more EVC slices 502. In certain embodiments, the EVC slice component track 602 can only contain VCL NAL units, which can have a TrackReferenceBox with an 'evcr' track reference type to link this type of track to the base track 604 containing non-VCL NAL units required to decode the VCL NAL units in the component track 602. For example, a sample definition for an EVC component track 602 could include the following:

Sample Entry Type: 'evs1'
Container: Sample Table Box ('stbl')
Mandatory: An 'evs1' sample entry is mandatory for EVC slice track
Quantity: One or more sample entries may be present
Box Type: 'evsC'
Container: EVC Slice Sample Entry ('evs1')
Mandatory: Yes
Quantity: One An EVC visual sample entry shall contain an EVC Slice Track Configuration Box when a track is an EVC slice component track 602, which includes an EVCSliceTrackConfigurationRecord. An optional BitRateBox may be present in the EVC visual sample entry to signal the bit rate information of the EVC slice data in this track. Multiple sample entries may be used, as permitted by the ISO Base Media File Format specification, to indicate sections of video that use different configurations or parameter sets in the configuration record 610. As a non-limiting example, a sample syntax for a slice component track 602 is provided below.

```
class EVCSliceTrackSampleEntry( ) extends VisualSampleEntry ('evs1'){
    EVCSliceTrackConfigurationBox    config;
}
class EVCSliceTrackConfigurationBox extends Box('evsC') {
    EVCSliceTrackConfigurationRecord( ) EVCSliceTrackConfig;
}
aligned(8) class EVCSliceTrackConfigurationRecord {
    unsigned int(16) numOfSlice;
    for (i=0; i < numOfSlice; i++) {
        unsigned int(16) numOfTile;
        for (i=0; j< numOfTiles; j++) {
            unsigned int(16) tileID;
        }
    }
}
``` where numOfSlice indicates a number of slices 502 contained in a respective component track 602, numOfTile indicates a number of tiles 506 in a slice 502, and tileID indicates a tile identification.

An EVC main slice track or base track 604 is a track contains non-VCL NAL units required to decode VCL NAL units in any EVC slice component tracks 602 reference by 'evcr' track reference. The base track 604 also has the parameter set required for decoding any of the EVC slice component tracks 602, which are only carried in a configuration record 610 of the EVC slice base track 604. This type of track can also include VCL NAL units of one or more slices 502 that belong to the same picture 500 with the EVC slice component tracks 602 referencing this base track 604. Restrictions can be applied to this type of track except that EVC main slice base track 604 does not include any SPS, PPS and APS, which are not included in the array of NAL units of the configuration record 610 of the base track 604 for simple and easy access of parameter sets by the application decoding the certain EVC slice component tracks 602 instead of a complete picture 500. In certain embodiments, initialization information is in a media data 612 of the base track 604. Parameter sets required for processing any other slice track can be in the configuration record 610 of the base track 604. The configuration record 610 is designated for parameter sets, although some parameter sets could be stored in the media data 612. When the parameter sets are stored in the media data 612, the parameter sets are copied into the configuration record 610 when needed to process one or more component tracks 602.

For example, a sample definition for an EVC component track 602 could include the following:
Sample Entry Type: 'evm1'
Container: Sample Table Box ('stbl')
Mandatory: An 'evm1' sample entry is mandatory for EVC main slice track
Quantity: One or more sample entries may be present
Box Type: 'evmC'
Container: EVC Main Slice Sample Entry ('evm1')
Mandatory: Yes
Quantity: One
An EVC visual sample entry shall contain an EVC Main Slice Track Configuration Box, as defined below when a track is an EVC main slice track. This includes an EVCDecoderConfigurationRecord defined in the clause 12.5.3 with following restrictions.
sps_in_streams shall be set to 0
pps_in_streams shall be set to 0
aps_in_streams shall be set to 0
An optional BitRateBox may be present in the EVC visual sample entry to signal the bit rate information of the EVC slice data in the base track 604. Multiple sample entries may be used, as permitted by the ISO Base Media File Format specification, to indicate sections of video that use different configurations or parameter sets. As a non-limiting example, a syntax for a base track 604 is provided below.

```
class EVCMainSliceTrackSampleEntry( ) extends VisualSampleEntry
('evm1'){
    EVCMainSliceTrackConfigurationBox    config;
}
class EVCMainSliceTrackConfigurationBox extends Box('evmC') {
    EVCDecoderConfigurationRecord( ) EVCMainSliceTrackConfig;
}
```

Although FIG. 6 illustrates a file 600, various changes may be made to FIG. 6. For example, the sizes, shapes, and dimensions of the file 600 and its individual components can vary as needed or desired. Also, the number and placement of various components of the file 600 can vary as needed or desired. In addition, the file 600 may be used in any other suitable imaging process and is not limited to the specific processes described above.

Figure 7:
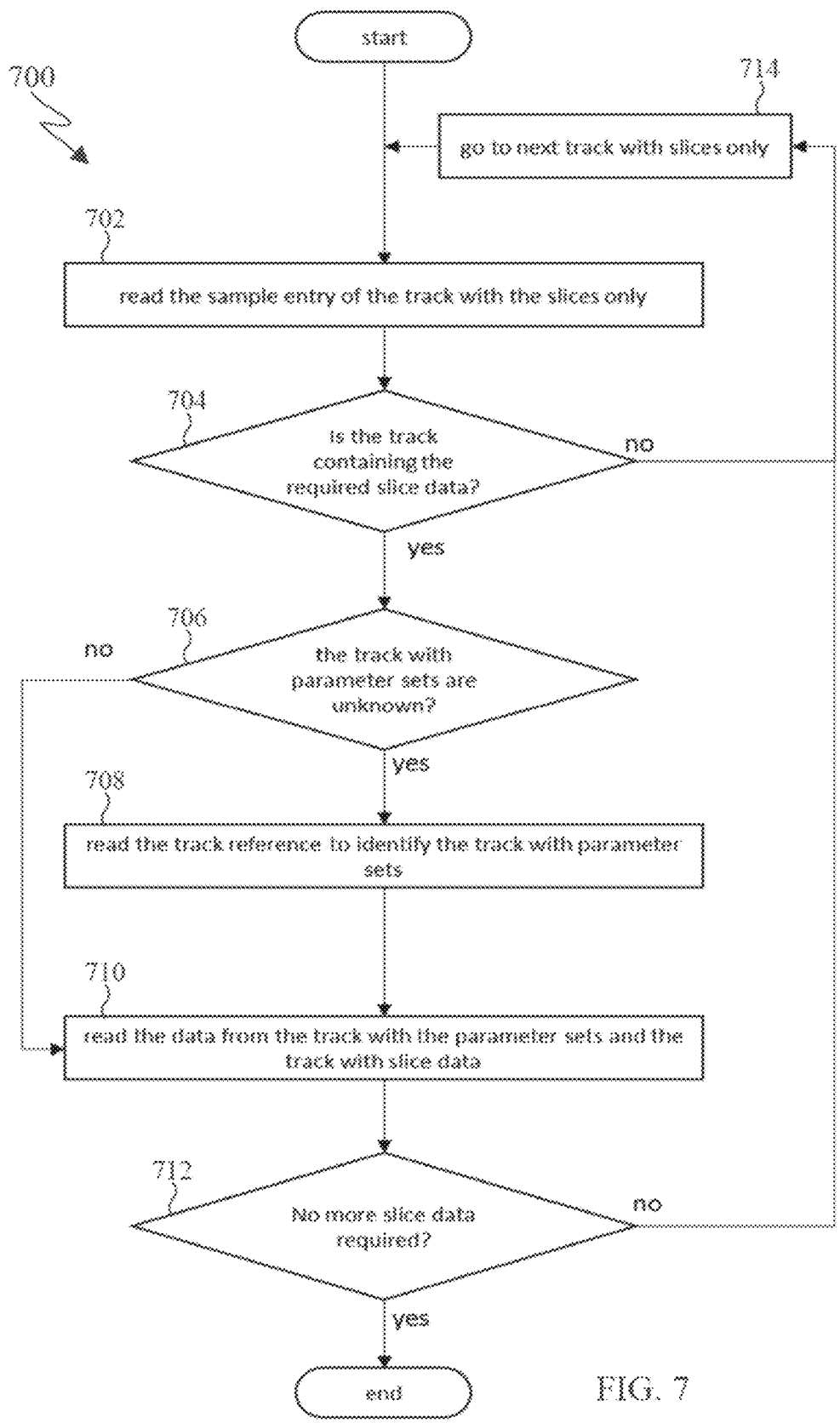
FIG. 7 illustrates an example method for fast and efficient access of EVC slices in a file according to this disclosure.

FIG. 7 illustrates an example method 700 for fast and efficient access of EVC slices in file according to this disclosure. For ease of explanation, the method 700 of FIG. 7 is described as being performed using the electronic device 300 of FIG. 3. However, the method 700 may be used with any other suitable system and any other suitable electronic device.

As shown in FIG. 7, the electronic device 300 reads a sample track of the track with the slices at step 702. The electronic device 300 can read the sample track of the track prior to and without reading any other tracks. The electronic device 300 reads a sample entry or configuration record 608 of the component track 602. In the method 700, particular slice information is required for a user, while other slice information is not required for a user.

The electronic device 300 determines whether the read track contains slice data required at step 704. Information included in the configuration record 608 of the component track 602 can indicate whether slice information is included in the media data 606 of the component track 602. When the component track 602 includes required slice data, the method 700 proceeds to step 706. When the track does not include required slice data, the method 700 proceeds to step 714

The electronic device 300 determines whether the parameter sets of processing the track are known at step 706. As an iterative process, the parameters sets for the slice data could have been read on a previously processed slice. When the parameter sets are unknown, the method 700 proceeds to step 708. When the parameter sets for the required slice data are known, the method 700 proceed to step 710.

The electronic device 300 reads the track reference to identify the track with parameter sets at step 708. The track reference can be stored in a configuration record 608 of a component track 602. The track reference indicates a base track 604 that includes the parameters sets for processing the slice data stored in the currently read component track 602.

The electronic device 300 reads the data from the base track 604 with the parameter sets and the component track 602 with the slice data at step 710. The data read from the component track 602 can be processed using the parameter sets stored in the base track 604.

The electronic device 300 determines whether any more slice data is required at step 712. Based on the objects for viewing by the user, the electronic device 300 can determine whether the completed object can be displayed based on the slice information processed from the components tracks 602. If more slice information is required for displaying the picture to the user, the method 700 proceeds to step 714. When the object is completed, the method 700 ends.

The electronic device 300 identifies the next track that contains required slice data at step 714. The electronic device 300 can read subsequent component tracks 602 until more slice information is identified as stored in a component track 602. Once a component track is identified with slice data, the method proceeds back to step 702.

Although FIG. 7 illustrates one example of a method 700 for fast and efficient access of EVC slices in file, various changes may be made to FIG. 7. For example, while shown as a series of steps, various steps in FIG. 7 may overlap, occur in parallel, or occur any number of times.

Figure 8:
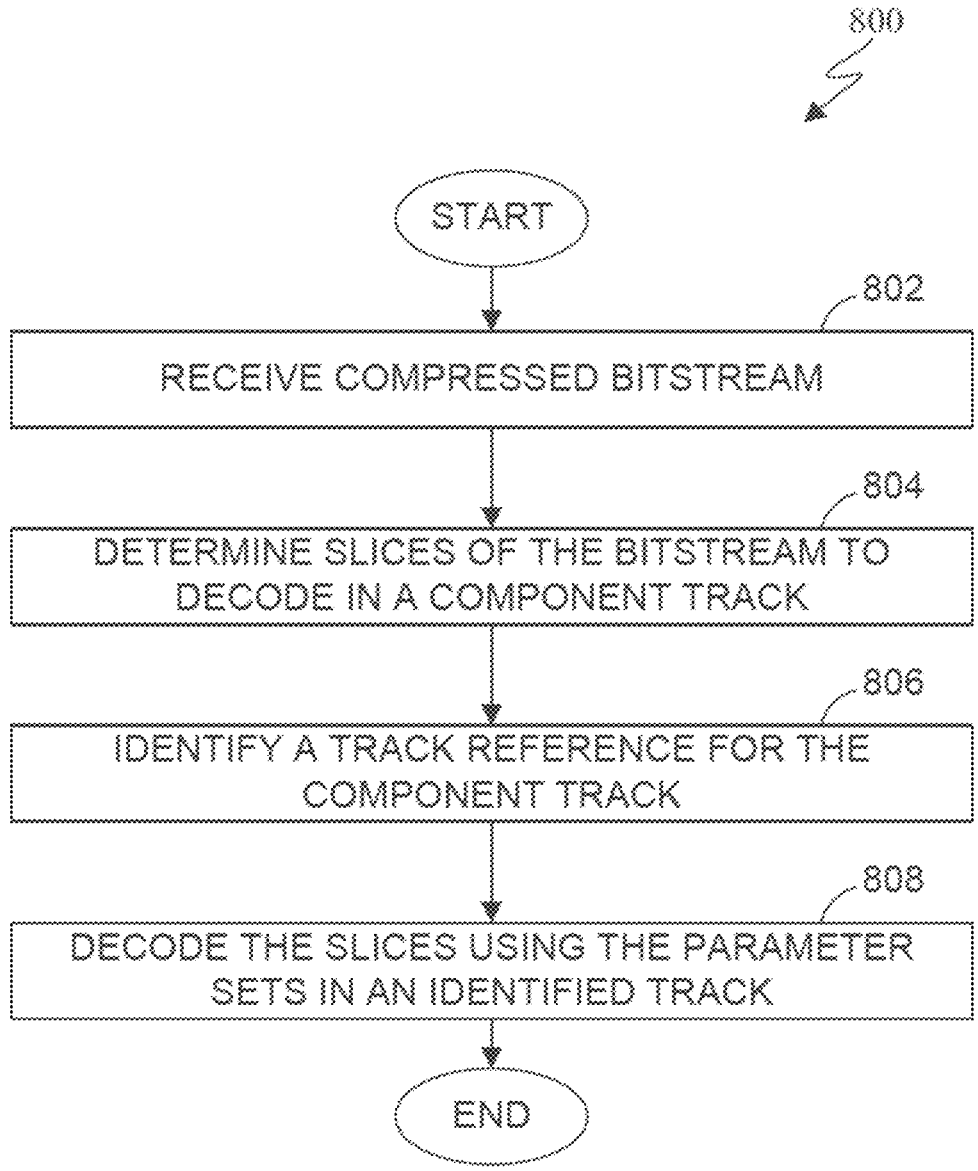
FIG. 8 illustrates an example method 800 for fast and efficient access of EVC slices in a file according to this disclosure.

FIG. 8 illustrates an example method 800 for fast and efficient access of EVC slices in a file according to this disclosure. For ease of explanation, the method 800 of FIG. 8 is described as being performed using the electronic device 300 of FIG. 3. However, the method 800 may be used with any other suitable system and any other suitable electronic device.

As shown in FIG. 8, the electronic device 300 receives a compressed bitstream at step 802. Receiving can refer to reading from a memory or receiving over a wired or wireless connection with an external device.

The electronic device 300 determines one or more slices of the compressed bitstream to decode in a component track at step 804. The electronic device 300 can identify information in the configuration file of a component track that indicates required slice data.

The electronic device 300 can identify a track reference in a configuration record of the component track, where the track reference identifies a track that is separate from the component track and the track includes parameter sets required to process the one or more slices at step 806. The track corresponding to the track reference is a base track and the parameters sets required for decoding or processing the one or more slices in the component track are only located in the base track. The parameter sets required for decoding the component track are located in a configuration record of the base track. The component track includes a sample entry type that indicates that the component track does not include any parameter set for decoding the one or more slices. Each track includes a sample entry type value indicating whether a specific track includes non-VCL NAL units which includes SPS parameter sets, PP parameter sets, or APS parameter sets. The component track can include a list of slice identifications for the one or more slices.

The electronic device 300 decodes for display the one or more slices using the parameter sets included in the indicated track at step 808. The identified parameters sets can be used to decode slice data for displaying on a display to a user. The slice information can be used to form a portion of a picture 500 or a portion of a PCC object.

Although FIG. 8 illustrates one example of a method 800 for fast and efficient access of EVC slices in a file, various changes may be made to FIG. 8. For example, while shown as a series of steps, various steps in FIG. 8 may overlap, occur in parallel, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims

What is claimed is:

1. A decoding device, the decoding device comprising:
a communication interface configured to receive a compressed bitstream; and
a processor operably coupled to the communication interface, the processor configured to:
identify one or more slices of the compressed bitstream to decode in a component track and a sample entry for the component track that indicates whether parameter sets for decoding the one or more slices are included in the component track;
identify a track reference in a configuration record of the component track, wherein the track reference indicates a track that is separate from the component track and the track includes parameter sets required to process the one or more slices; and
decode for display the one or more slices using the parameter sets included in the indicated track and parameter sets included in the component track indicated by the sample entry,
wherein the track corresponding to the track reference is a base track, and
wherein the processor is further configured to copy parameter sets located in media data of the base track into a configuration record of the base track.

2. The decoding device of claim 1, wherein the parameter sets required for decoding the one or more slices in the component track are only located in the base track.

3. The decoding device of claim 1, wherein the parameter sets required for decoding of the component track are located in the configuration record of the base track.

4. The decoding device of claim 1, wherein the component track includes a sample entry type that indicates that the component track does not include any parameter set for decoding the one or more slices.

5. The decoding device of claim 1, wherein each track includes a sample entry type value indicating whether a specific track includes non-video coding layer (VCL) network abstraction layer (NAL) units whose includes a sequence parameter set (SPS), a picture parameter set (PPS), or an adaptation parameter set (APS).

6. The decoding device of claim 1, wherein the component track includes a list of slice identifications for the one or more slices.

7. The decoding device of claim 1, wherein the processor is further configured to:
identify an additional slice of the compressed bitstream to decode;
identify that the parameter sets for processing the one or more slices also are used to process the additional slice; and
decode for display the additional slice using the parameter sets for decoding the one or more slices.

8. A method, the method comprising:
receiving a compressed bitstream and metadata related to the compressed bitstream;
identifying one or more slices of the compressed bitstream to decode in a component track and a sample entry for the component track that indicates whether parameter sets for decoding the one or more slices are included in the component track;
identifying a track reference in a configuration record of the component track, wherein the track reference indicates a track that is separate from the component track and the track includes parameter sets required to process the one or more slices, wherein the track corresponding to the track reference is a base track;
copying parameter sets located in media data of the base track into a configuration record of the base track; and
decoding for display the one or more slices using the parameter sets included in the base track and parameter sets included in the component track indicated by the sample entry.

9. The method of claim 8, wherein the parameter sets required for decoding the one or more slices in the component track are only located in the base track.

10. The method of claim 8, wherein the parameter sets required for decoding of the component track are located in the configuration record of the base track.

11. The method of claim 8, wherein the component track includes a sample entry type that indicates that the component track does not include any parameter set for decoding the one or more slices.

12. The method of claim 8, wherein each track includes a sample entry type value indicating whether a specific track includes non-video coding layer (VCL) network abstraction layer (NAL) units whose includes a sequence parameter set (SPS), a picture parameter set (PPS), or an adaptation parameter set (APS).

13. The method of claim 8, wherein the component track includes a list of slice identifications for the one or more slices.

14. An encoding device, the encoding device comprising:
a processor operably configured to:
   encode parameter sets in a track for processing one or more slices in a component track;
   encode one or more slices in the component track that is separate from the track with the parameter sets;
   encode a sample entry for the component track that indicates whether parameter sets for decoding the one or more slices are included in the component track; and
   encode a track reference in a configuration record of the component track, wherein the track reference indicates the track including the parameter sets required to process the one or more slices; and
a communication interface operably coupled to the processor, the communication interface configured to transmit a compressed bitstream including the track and the component tracks,
   wherein the track corresponding to the track reference is a base track, and
   wherein the processor is further configured to encode parameter sets in media data of the base track.

15. The encoding device of claim 14, wherein the parameter sets required for decoding the one or more slices in the component track are only located in the base track.

16. The encoding device of claim 14, wherein parameter sets are located in a configuration record of the base track.

17. The encoding device of claim 14, wherin the component track includes a sample entry type that indicates that the component track does not include any parameter set for decoding the one or more slices.

18. The encoding device of claim 14, wherein each track includes a sample entry type value indicating whether a specific track includes non-video coding layer (VCL) network abstraction layer (NAL) units whose includes a sequence parameter set (SPS), a picture parameter set (PPS), or an adaptation parameter set (APS).

19. The encoding device of claim 14, wherein the component track includes a list of slice identifications for the one or more slices.

20. The encoding device of claim 14, wherein:
   the processor is further configured to encode an additional slice of the compressed bitstream, and
   the parameter sets for processing the one or more slices also are for processing the additional slice.

* * * * *